United States Patent [19]
Asada et al.

[11] Patent Number: 4,703,364
[45] Date of Patent: Oct. 27, 1987

[54] PROCESSOR SYNCHRONOUS IMAGE SCANNER CONTROLLING METHOD

[75] Inventors: Shigeki Asada; Hiroshi Yanagisawa, both of Kanagawa, Japan

[73] Assignee: International Business Machines Corp., Armonk, N.Y.

[21] Appl. No.: 880,471

[22] Filed: Jun. 30, 1986

[30] Foreign Application Priority Data

Jul. 5, 1985 [JP] Japan .............................. 60-146919

[51] Int. Cl.$^4$ ............................................. H04N 1/04
[52] U.S. Cl. .................................. 358/285; 353/293; 353/280
[58] Field of Search ............... 358/294, 293, 285, 280, 358/261

[56] References Cited

U.S. PATENT DOCUMENTS 4,150,873  4/1979  Dali ..................................... 358/294

Primary Examiner—Edward L. Coles, Sr.
Attorney, Agent, or Firm—John B. Frisone

[57] ABSTRACT

The invention directly controls the start of application of clock pulses to a shift register of an image sensor unit in synchronism with read signals supplied from a processor unit, to transfer video data of successive scan lines of an image. Transfer time of video data of one scan line from the shift register to the processor unit is compared to a predetermined time period. If the transfer time exceeds the predetermined time period, transfer of video data of the next scan line to the shfit register is allowed after the video data of the one scan line in the shift register has been transferred to the processor unit, whereby electric charges for the next scan line accumulated in the photodiodes are vanished. And, the video data of the next scan line in the shift register is discarded. In addition, the invention is devised to provide a data disposing cycle in the operation mode of the shift register in addition to the data reading cycle, so that, even when interruption from others causes the operation of the processor fetching the video data from the shift register to exceed a predetermined scanning time before completion of the operation, the data disposing cycle is inserted right after completion of the operation to disposed high level data that has been sensed for a long period of time by a photosensor of the sensor unit, and normal level data or image information properly representing an image being scanned is obtained.

8 Claims, 7 Drawing Figures

PROCESSOR SYNCHRONOUS IMAGE SCANNER CONTROLLING METHOD

The invention relates to a method for controlling an image scanner, that is, an image input device, and more particularly, to an image scanner controlling method that starts to apply clock pulses to a shift register in a sensor unit of the image scanner in synchronization with read signals from a processor.

PRIOR ART

In general, low-cost image scanners that scan and sense an image by causing relative movement, with a motor, between a sensor and the image to be sensed have limitations in memory size, in data processing rate and data transfer rate of the processor, so that it accompanies operation of start and stop in reading image data so as not to be affected by their limitations. The read image data is fetched from a CCD shift register consisting of a charge transfer device, more particularly, a charge-coupled device (CCD) as video data. Once the video data starts to be fetched from the CCD shift register with predetermined pulses for fetching the video data from the CCD shift register, the video data for one line must be fetched.

FIG. 6 shows an example of the sensor unit of the image scanner. It has an array of photodiodes 60 and a CCD shift register 61. Image data stored in the photodiode 60 is transferred to the CCD shift register 61 by a pulse TP for transfer, and fetched from the CCD shift register 61 as video data VD by a clock pulse CP.

FIG. 7 shows a conventional image scanner controlling method. Because video data is arranged to be sent from a CCD shift register 71 to a buffer memory 74 through an 8-bit serial-parallel register 72 at regular intervals by predetermined clock pulses from an oscillator 70 with constant frequency, a DMA controller 73 is required as hardware. In addition, the buffer memory 74 is required to have storage capacity for at least two lines. A processor 75 reads and processes the video data stored in the buffer memory 74.

A software program loop may be used as an alternative to a DMA controller. If such a program loop is employed, the processor is used exclusively for reading the video data, and the software imposed limitations prohibit execution of other programs. Even in the program loop method, the video data is sent to and stored in the buffer memory with the program loop from the CCD shift register through the 8-bit serial-parallel register by predetermined clock pulses, and the processor reads and processes the video data stored in the buffer memory during a time other than that for reading the data.

As described, the conventional image scanner controlling method is to read the image data without direct participation of the processor, and to store the video data in the buffer memory by the DMA method or the program loop method. Therefore, it is required to provide a DMA controller and a buffer memory in the image scanner which increases the size and price of the image scanner.

BRIEF DESCRIPTION OF THE INVENTION

An object of the invention is to provide a method for controlling an image scanner without use of the conventional DMA or program loop method.

To this end, the image scanner controlling method according to the invention is arranged to start application of clock pulses to a shift register in a sensor unit of the image scanner in synchronization with a read signal from a processor. Because the video data can be fetched in the processor by the direct participation of the processor in reading the image data, it is not required to store the video data in the buffer memory, so that hardware can have a simple configuration.

However, such direct participation of the processor may cause the following. If there is interruption from others to the processor, reading of the video data is suppressed to cause the operation of the processor reading the video data to exceed predetermined scanning time before completion of the operation. When such a situation occurs, the image scanner controlling method according to the invention is arranged to stop the transfer of sense data for video data of the next scanning line from a photosensor in a sensor unit to a shift register, to complete reading of the video data by applying clock pulses, to transfer the sense data of high level stopped to be transferred to a shift register, then to fetch it from the shift register as the video data by applying clock pulses and dispose of it, to take sense data again for the video data for the next scanning line, and to fetch the video data from the next scanning line from the shift register by applying clock pulses.

The following method in accordance with the present invention includes the following steps:

1. start the application of clock pulses to the shift register in synchronism with read signal generated by a processor unit to transfer video data of one scan line to the processor unit;
2. determine if a transfer time of the video data of the one scan line from the shift register to the processor unit exceeds a predetermined time period;
3. inhibit a transfer of video data of next scan line from the photodiode rray to the shift register when it is determined that the transfer time of the one scan line exceeds the predetermined time period;
4. allow the transfer of the video data of the next scan line from the photodiode array to the shift register after the video data of the one scan line has been transferred to the processor unit;
5. discard the video data of the next scan line from the shift register to reset the shift register; and
6. transfer again the video data of the next scan line from the photodiode array to the shift register.

In addition, for reducing processing load on the processor and enabling high speed linear data compression, the image scanner controlling method according to the invention takes the following approach. It not only starts to apply clock pulses to the shift register in the sensor unit of the image scanner, but also resets a run length counter of the image scanner and then starts to apply clock pulses to the run length counter, in synchronization with a read signal from a processor, detects a binary change point of binary video data based upon the output data from the shift register, thereby stopping application of clock pulses to the shift register and the run length counter and causing interruption to the processor. The value of the run length counter is supplied to the processor to make the processor deal with the value, and causes the processor to output a read signal when the processor becomes available after completion.

It is desirable to start the application of clock pulse to the shift register by making a gate means receiving clock pulses from an oscillator conductive in synchronization with a read signal from the processor. A similar approach is applied to start the application of clock pulse to the run length counter. Also, it is desirable to use a shift register consisting of a charge transfer device as the shift register and a photodiode connected with a capacitor in parallel as the photosensor. Furthermore, starting the application of clock pulse to the shift register and the run length counter may be performed by setting a latch means with a read signal from the processor and making the gate means conductive with the output signal from the latch means. Stopping the application of clock pulse to the shift register and the run length counter and the interruption to the processor may be performed by resetting the latch means at the same time that the binary change point is detected and supplying the output signal from latch means to the gate means and the processor.

DETAILED DESCRIPTION OF THE INVENTION

Figure 1:
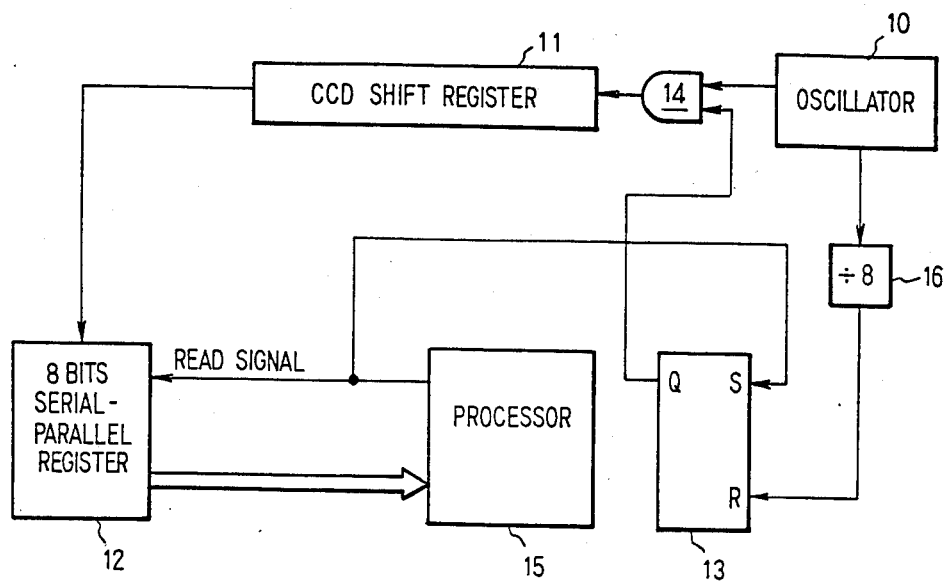
FIG. 1 is a block diagram for illustrating one embodiment of the invention.

FIG. 1 shows one embodiment of the image scanner and controlling method according to the invention. Clock pulses to a CCD shift register 11 are generated in synchronization with a read signal from a processor 15. Therefore, the processor can directly read video data with a read command. Thus, the image scanner does not require hardware such as a DMA controller and a buffer memory.

In the embodiment of FIG. 1, the clock pulses are supplied from an oscillator 10 with constant frequency to the CCD shift register 11 by 8 clocks in synchronization with the read signal from the processor 15. A latch means 13 is set by the read signal from the processor 15 to make a gate means 14 conductive. When 8 clock pulses are supplied to the CCD shift register, a signal is generated from a counter 16 to reset the latch means 13. This causes the gate means 14 to be non-conductive, and the clock pulses are not supplied to the CCD shift register until the next read signal is supplied from the processor 15.

Basically, as above, the video data is directly read by the processor through an 8-bit serial-parallel register 12. This cycle constitutes a data reading cycle.

By the way, the processor may be subject to interruption from others so as to effectively utilize its processing capability and to provide limitations on dedicated use of program control as little as possible. If the processor is interrupted, it suppresses the reading of video data. This causes the reading operation of video data to be significantly delayed. And the video data for one line may not be read within a predetermined scanning time for one line. In such case, a pulse for transfer is stopped and the data reading cycle is continued until the reading of video data for one line is completed. When the transfer clock is stopped, the photodiode becomes overcharged, and sense data does not properly represent an image being scanned any more. It is required to dispose of the sense data after transferring it to the CCD shift register and fetching it as video data from the CCD shift register, and to take data for the same line again. The cycle to dispose the overcharged data constitutes a data disposing cycle.

Figure 2:
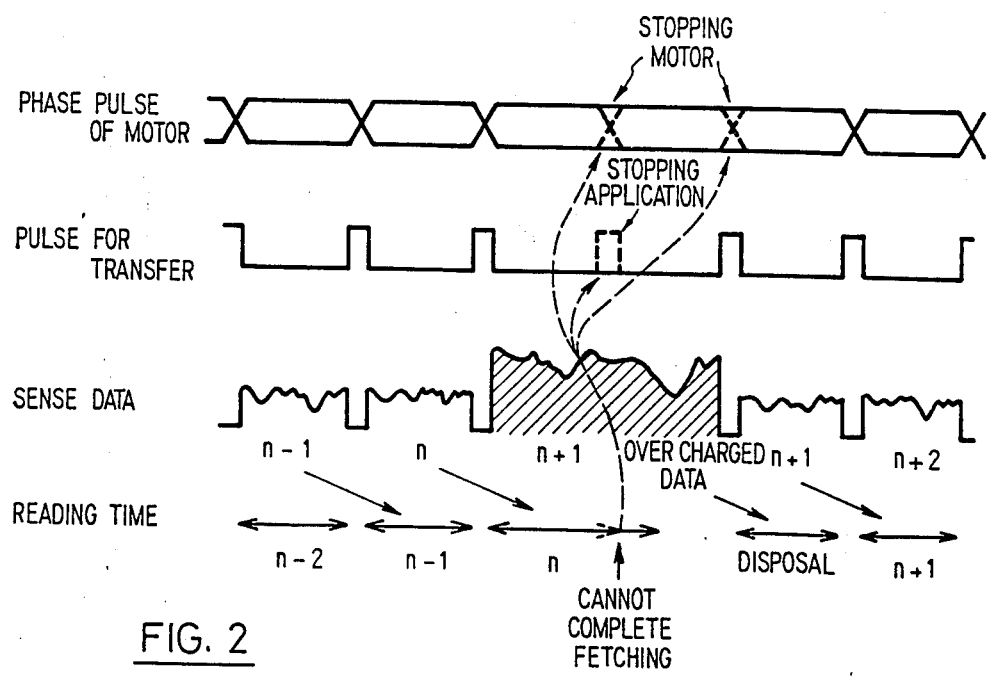
FIG. 2 is a timing chart for illustrating another embodiment of the invention.

FIG. 2 shows an example where the processor fails to read all video data for the n+1)-th line. In such case, as seen from FIG. 2, the pulse for transfer for the (n+1)-th line is stopped. Accompanying it, a phase pulse for a motor also causes no change. The phase pulse is arranged not to cause further change so as to take data for the (n+1)-th line again. On the (n+1)-th line, the overcharged data is disposed and the data taken again.

Figure 3:
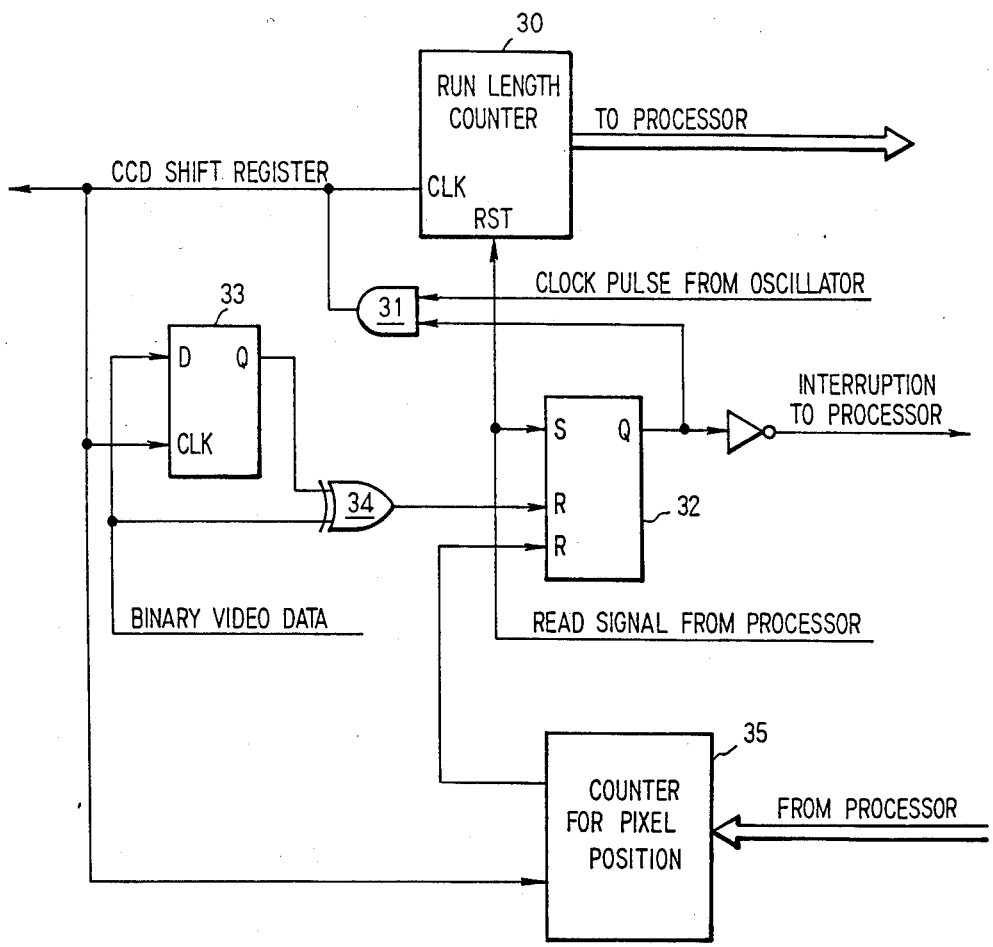
FIG. 3 is a block diagram for illustrating yet another embodiment of the invention.

Furthermore, FIG. 3 shows another embodiment of the image scanner and controlling method according to the invention. Only by adding a hardware configuration as shown in FIG. 3, it is possible to perform with a simple hardware configuration and not causing so much load on the processor, the processing such as high speed linear data compression, partial scan or scaling that, if performed by hardware, requires separately a buffer memory and its associated circuit means to increase the size, and that, if performed by software, uses most of the processing capability of the processor because it is used for processing the video data. This is because the processor is not needed to find run length by checking the video data thoroughly, but only needed to receive a value of run length.

The hardware configuration shown in FIG. 3 consists of a run length counter 30, a gate means 31, a latch means 32, a pixel change detecting means 33, a gate means 34 thereof, and a counter 35 for pixel position.

The operation of the hardware configuration shown in FIG. 3 is described below. First, read signals from the processor set the latch means 32 and reset the run length counter 30. When the latch means 32 is set, its output signal causes the gate means 31 to be conductive allowing clock pulses from the oscillator to pass and be applied to the CCD shift register in the sensor unit and the run length counter 30. The application of clock pulses to the CCD shift register causes the CCD shift register to output the video data. The binary video data based on the output signals of the CCD shift register is supplied to the pixel change detecting means 33. If the pixel change detecting means 33 detects a change point, for example, a transition from white to black or from black to white, in the binary video data, it provides a signal to its gate means 34 to reset the latch means 32. Once the latch means 32 is reset, its output signal prevents the clock signals from the oscillator passing by making the gate means 31 non-conductive so as to stop the application of clock pulses to the CCD shift register and the run length counter 30, as well as to interrupt the processor. At that moment, the processor receives the value of the run length counter 30 to perform processing such as data compression. When the processor becomes available after completion of the processing, it supplies the read signal again to the latch means 32 and the run length counter 30, to set the latch means 32 and to reset the run length counter 30. Setting of the latch means 32 causes the clock pulses again to be applied to the CCD shift register and the run length counter 30.

The counter 35 for pixel position is used for the partial scan, etc. because it indicates from which pixel on a line the video data is read. The counter 35 also indicates the completion of reading of video data from one line.

Figure 4:
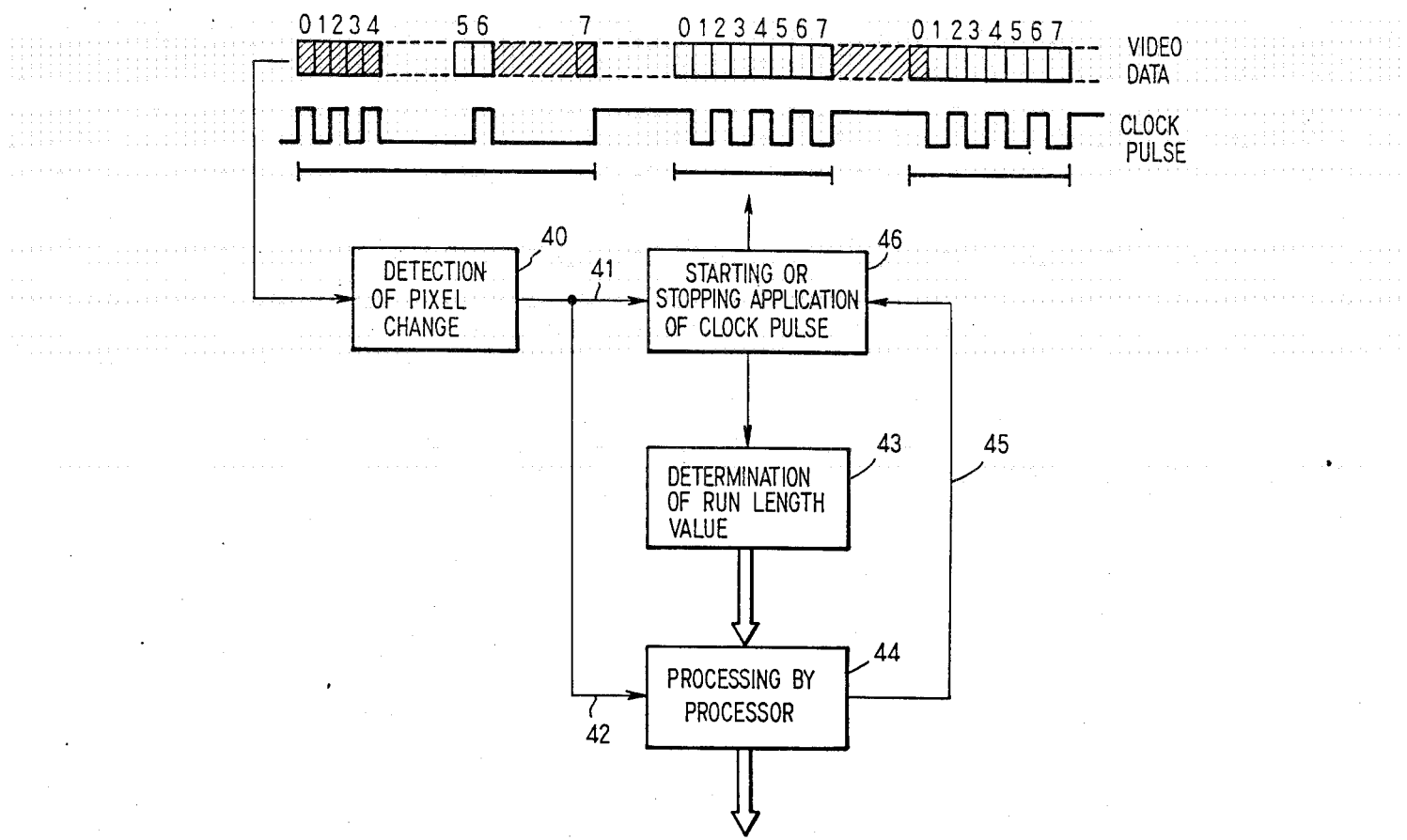
FIG. 4 is a view illustrating data processing based on the invention.
Figure 5:
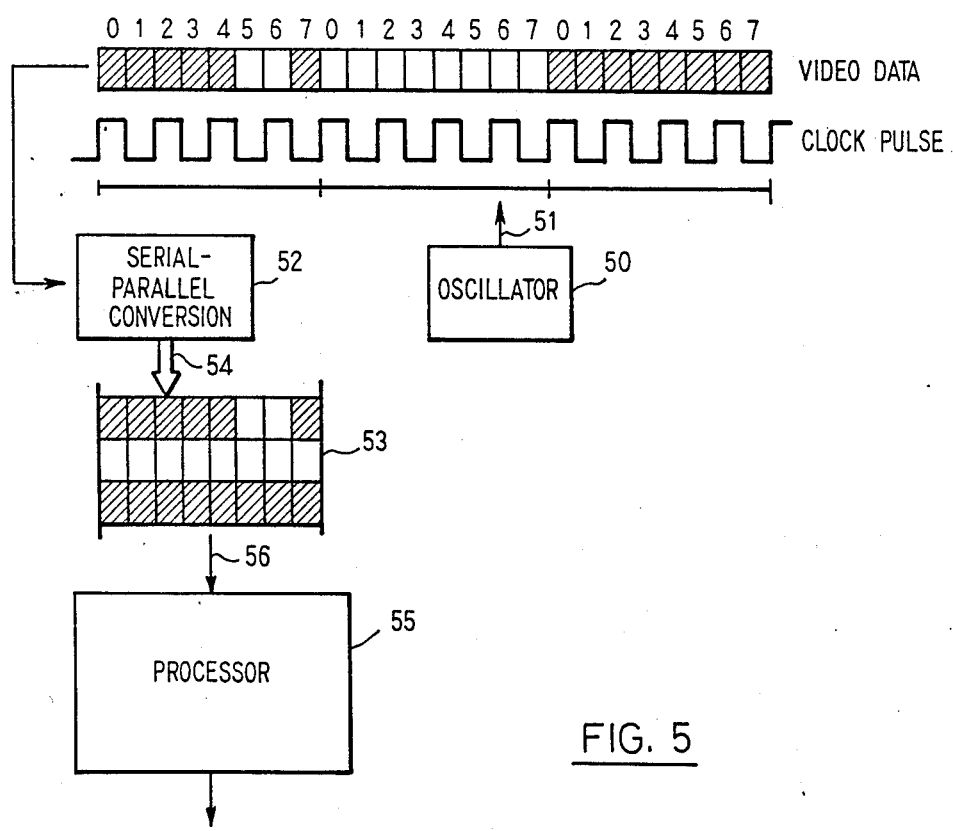
FIG. 5 is a view illustrating conventional data processing.
Figure 6:
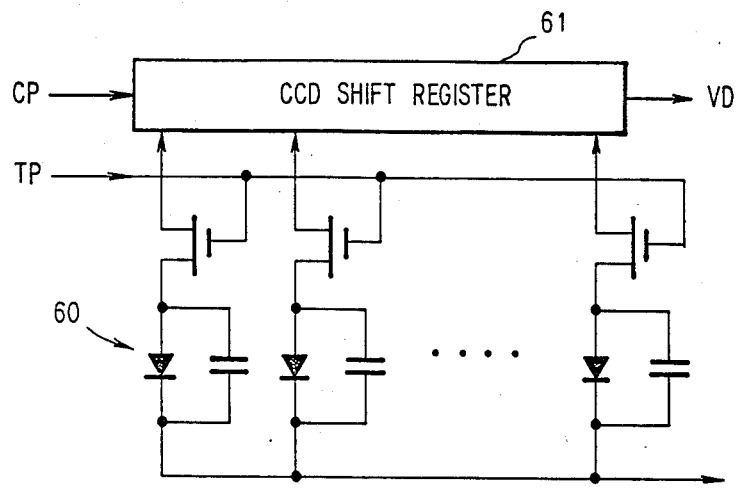
FIG. 6 is a circuit diagram of a sensor unit of an image scanner.
Figure 7:
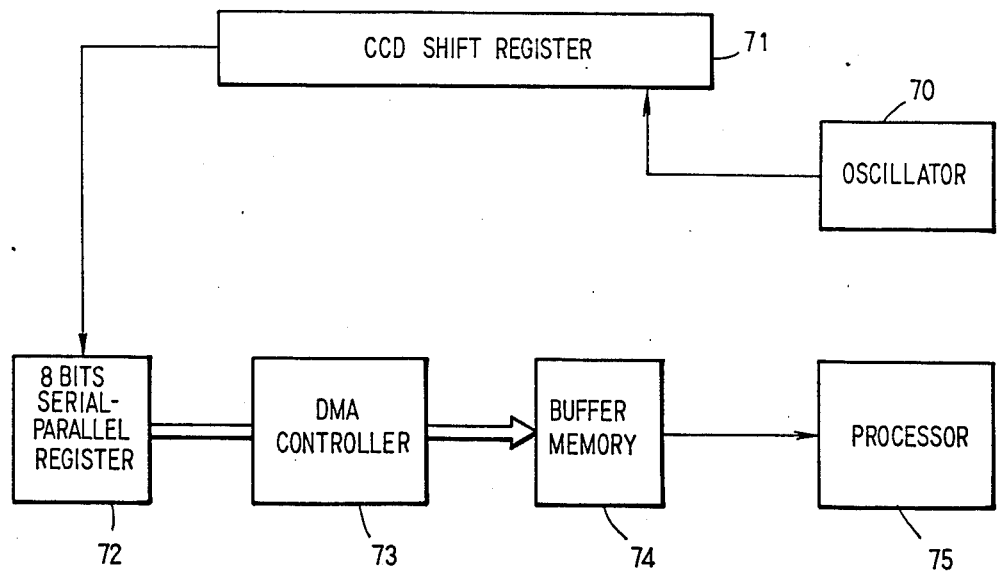
FIG. 7 is a block diagram for illustrating a conventional image scanner controlling method.

FIGS. 4 and 5 show a method according to the invention and a conventional method for performing the linear data compression, respectively.

In the method according to the invention shown in FIG. 4, the clock pulses to the CCD shift register are applied in synchronization with a read signal from the processor, so that they are not constant as in the conventional method shown in FIG. 5. Because the CCD shift register is two-phase driven, one shift is caused in each of high and low level of the clock pulses. Since, in the video data from 0 to 7th bit from the left, black continues from 0 to 4th bit, the clock pulses continue to be applied. Since it changes to white at 5th bit, change from black to white is detected (40), stopping to apply the clock pulses being instructed (41) to stop the application (46) and to provide the interruption to the processor (42). Since a run length value is determined at that moment (43), the processor receives that run length value for processing (44). Then, when the processor becomes available after completion of processing, it supplies the read signal (45) to start the application of clock pulses again (46). The application of clock pulses is slow in 5th to 6th bit from the left because there exists time that the processor performs processing by using the value of the run length counter between the suppression and the restart of application of clock pulses. Same is applied to other regions where the application of clock pulses is slow.

On the other hand, in the conventional method shown in FIG. 5, constant clock pulses (51) are applied to the CCD shift register by an oscillator 50, the video data outputted from the CCD shift register being serial-parallel converted (52) before it is stored in a buffer memory 53 by the DMA method or the program loop method (54). Then, the video data stored in the buffer memory 53 is read by the processor (56), which must find a run length value after checking the read video data one by one and perform data compression.

While the invention has been particularly shown and described with reference to a preferred embodiment thereof, it will be understood by those skilled in the art that various changes in form and details may be made therein without departing from the spirit and scope of the invention.

Having thus described our invention, what we claim and desire to secure as Letters Patent is as follows:

1. Method for transferring video data representing an image from a sensor unit to a processor unit in which the sensor unit and the image are moved relative to each other to successively scan said image and the sensor unit includes a photodiode array and a shift register, characterized by steps of:
   starting to apply clock pulses to the shift register in synchronism with read signal generated by a processor unit to transfer video data of one scan line to the processor unit;
   determining if a transfer time of the video data of the one scan line from the shift register to the processor unit exceeds a predetermined time period;
   inhibiting a transfer of video data of next scan line from the photodiode array to the shift register when it is determined that the transfer time of the one scan line exceeds the predetermined time period;
   allowing the transfer of the video data of the next scan line from the photodiode array to the shift register after the video data of the one scan line has been transferred to the processor unit;
   discarding the video data of the next scan line from the shift register to reset the shift register; and
   transferring again the video data of the next scan line from the photodiode array to the shift register.

2. A method set forth in claim 1, wherein the application of said clock pulses to said shift register is started by making a gate means receiving clock pulses of an oscillator conductive in synchronization with said read signal.

3. A method set forth in claim 1 or 2, wherein a shift register consisting of a charge transfer device is used as said shift register.

4. A method set forth in claim 1 or 2 wherein a photodiode connected with a capacitor in parallel is used as said photosensor.

5. A processor synchronous image scanner controlling method characterized by steps of:
   starting to apply clock pulses to a shift register in a sensor unit of an image scanner and resetting a run length counter of said image scanner and then starting to apply said clock pulses to said run length counter, in synchronization with a read signal from a processor;
   detecting a binary change point of binary video data based on output data of said shift register;
   stopping the application of said clock pulses to said shift register and said run length counter and providing interruption to said processor;
   supplying a value of said run length counter to said processor to make said processor deal with said value; and
   causing said processor to output said read signal when said processor becomes available after completion of dealing with.

6. A method set forth in claim 5, wherein the application of said clock pulses to said shift register and said run length counter is started by making a gate means receiving clock pulses of an oscillator conductive in synchronization with said read signal.

7. A method set forth in claim 6, wherein the application of said clock pulses to said shift register and said run length counter is started by setting a latch means with said read signal and making said gate means conductive with output signal from said latch means.

8. A method set forth in claim 7, wherein stopping the application of said clock pulses to said shift register and said run length counter, and the interruption to said processor are performed by resetting said latch means at the same time that said binary change point is detected, and supplying output signal from said latch means to said gate means and said processor.

* * * * *